Patented Apr. 2, 1929.

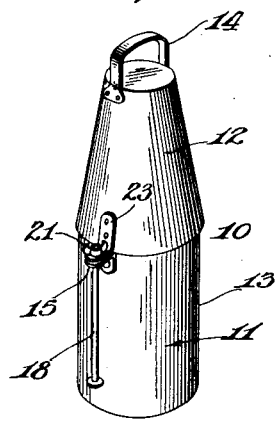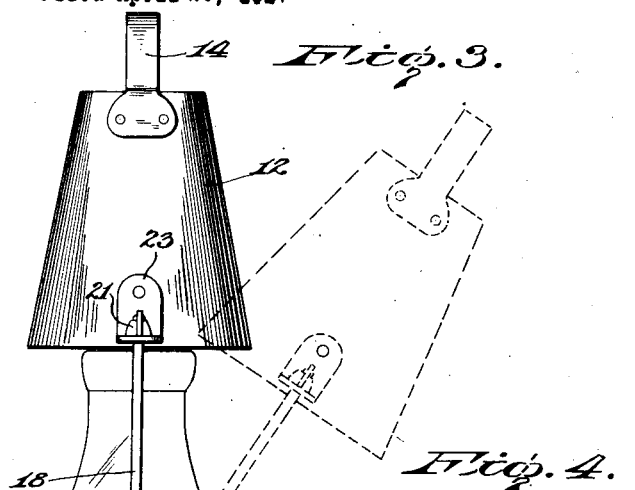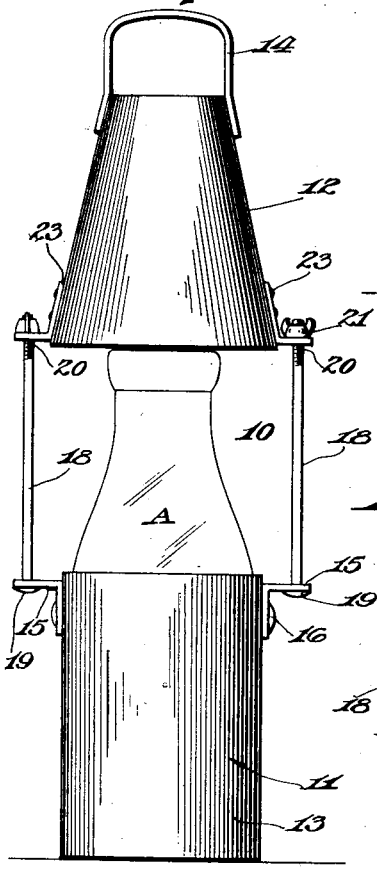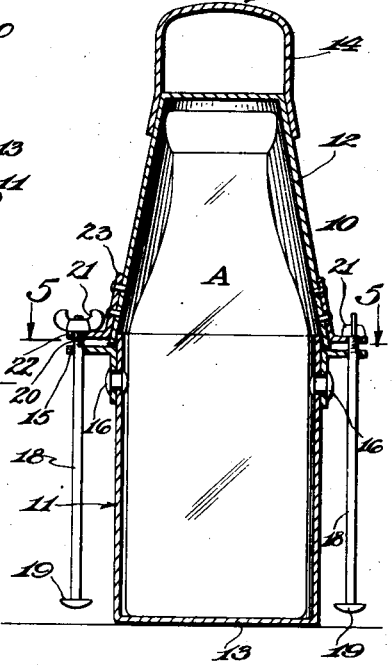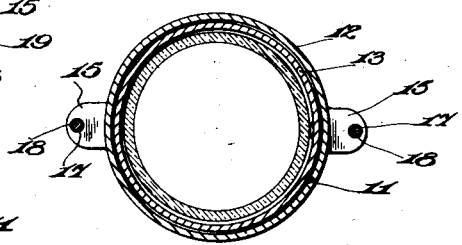

1,707,883

UNITED STATES PATENT OFFICE.

JOAQUIN SILVA, OF BROOKLYN, NEW YORK.

MILK-BOTTLE HOLDER.

Application filed April 25, 1927. Serial No. 186,365.

This invention relates to improvements in milk bottle holders.

The primary object of the invention resides in a milk bottle holder or container which may be placed upon the porch or steps of a dwelling for receiving the delivery of a bottle of milk for protecting the same from spoiling due to the sun, heat and dust, and also from germs which may be left by cats and dogs licking the tops of milk bottles when left exposed.

Another object of the invention is the provision of a milk bottle container which includes a bottle holder section having a captive cover mounted thereon by which the container may be lifted and carried, and when so lifted the cover is automatically moved to an open position for swinging movement to facilitate the removal of the bottle therefrom.

A further object of the invention is to provide a milk bottle container which includes a holder section and a captive cover which automatically seats itself upon said holder section when released by the hand of an operator.

A still further object is to provide a milk bottle container for maintaining a bottle of milk in a sanitary condition when exposed to the elements, and which is simple in construction, inexpensive of manufacture and strong and durable for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my milk bottle container showing the cover in a closed position.

Figure 2 is a front elevation with the cover in a raised position.

Figure 3 is a side elevation showing the cover in the position shown in Figure 2, but showing in dotted lines, the position of the cover when swung back to remove a bottle from the container.

Figure 4 is a vertical sectional view with the cover in the position shown in Figure 1.

Figure 5 is a horizontal sectional view on the line 5—5 of Figure 4.

Referring more particularly to the drawing, the reference numeral 10 designates my improved milk bottle container in its entirety which includes a holder or body section 11 and a captive cover section 12 for co-action with the holder section for providing a closed water-tight structure. Both sections are constructed of light sheet metal such as galvanized iron to withstand the elements without rusting.

The holder or body section 11 comprises a cup shaped receptacle 13 which is closed at one end to provide a flat bottom and an open top to permit of the insertion of a bottle of milk. The diameter of the receptacle is such as to snugly receive a milk bottle A of standard size, but is of a height to allow the top or neck to project thereabove.

The cover section 12 is of inverted frustro-conical configuration, and is sufficiently wide enough at its widest end to fit down over the open top of the section 11 and rest upon the walls thereof and overhang the same. By providing a cover of this shape, it will be seen that rain water will drain off and cannot reach the inside of the holder section 11 as the same acts as a shed. The narrow or top end of the cover is flat and has a handle member 14 fixedly mounted thereon by which the device may be lifted and carried.

For captively mounting the cover 12 on the body 11, I provide right angle brackets 15 on the receptacle 13 and which are pivoted thereto at diametrically opposite points as at 16. The outwardly extending arms of the brackets 15 are provided with openings 17 for the passage of rods 18, each of which has a head 19 at one end and screw threads 20 at its opposite end. An adjusting nut 21 coacts with the threads 20 on each rod whereby the rod is held from pulling out of the bracket and by which the limit of upward movement of the cover section may be regulated. The rods 18 also pass through openings 22 provided in the outwardly extending arms of brackets 23 fixedly mounted on the exterior of said cover sections at diametrically opposite points and disposed in alignment with the brackets 15 when the cover is in a closed position.

In operation, when it is desired to insert a bottle into the container, the cover is lifted vertically to the limit of its upward movement by grasping the handle 14, and is swung backwardly upon the pivots 16. The top of the holder section is now exposed to receive the bottle A. When the bottle is seated therein, the neck of the bottle extends above the top of the section 10, but the cover section has sufficient vertical movement to clear the top of the bottle to allow the same to be swung to a position shown in Figure 2 of the drawings.

To remove the bottle, the cover is lifted in a manner just described and which cover is automatically lifted when the handle is grasped for carrying purposes.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A container adapted for enclosing a milk bottle, comprising a base holder section, and a conical, truncated cover section, a pair of pivoted brackets on said base section, a pair of fixed brackets on said cover section, pendant rods slidable through the pivoted brackets and adjustable nuts terminally securing said rods above said fixed brackets for allowing upward movement of said cover section, terminal heads on said rods to contact with said pivoted brackets and limit said upward movement, and a handle rigid with said conical cover section for facilitating manual swinging of the latter rearwardly to an open position.

In testimony whereof I hereby affix my signature.

JOAQUIN SILVA.